United States Patent [19]
Shimada et al.

[11] Patent Number: 5,195,607
[45] Date of Patent: Mar. 23, 1993

[54] EXHAUST SYSTEM FOR AUTOMOTIVE ENGINE

[75] Inventors: Yukiichiro Shimada, Hiroshima; Nobuhiro Komatsu, Yokohama; Seiichi Tsuji, Hiroshima; Satoshi Fujita, Hiroshima; Hiroshi Nakatsuka, Hiroshima; Hiromichi Kawamura, Hiroshima; Makoto Shinhama, Hiroshima, all of Japan

[73] Assignee: Mazda Motor Corporation, Hiroshima, Japan

[21] Appl. No.: 615,630

[22] Filed: Nov. 19, 1990

[30] Foreign Application Priority Data

| Nov. 21, 1989 | [JP] | Japan | 1-135898 |
| Nov. 21, 1989 | [JP] | Japan | 1-135899 |
| Nov. 24, 1989 | [JP] | Japan | 1-136355 |
| Nov. 24, 1989 | [JP] | Japan | 1-136356 |
| Nov. 27, 1989 | [JP] | Japan | 1-137498 |

[51] Int. Cl.$^5$ ............................ B60K 13/04; B60K 5/04
[52] U.S. Cl. .................................... 180/296; 180/297; 180/89.2; 180/309; 60/299; 60/323
[58] Field of Search ............... 180/89.2, 296, 297, 180/309; 60/298, 299, 320, 323, 324; 296/185

[56] References Cited

U.S. PATENT DOCUMENTS

| 3,459,444 | 8/1969 | Rofe | 180/296 X |
| 3,708,980 | 1/1973 | Truxell | 60/323 X |
| 4,074,525 | 2/1978 | Le Salver | 180/296 X |
| 4,327,811 | 5/1982 | Isaka | 180/296 X |
| 4,731,993 | 3/1988 | Ito et al. | 60/299 |
| 4,966,408 | 10/1990 | Yura | 180/89.2 X |
| 5,050,701 | 9/1991 | Okui et al. | 180/297 |

FOREIGN PATENT DOCUMENTS

| 968970 | 6/1975 | Canada | 60/299 |
| 0279710 | 8/1988 | European Pat. Off. | 60/323 |
| 56-159606 | 11/1981 | Japan . | |
| 0196918 | 11/1984 | Japan | 60/299 |
| 0050215 | 3/1985 | Japan | 60/323 |
| 61-164418 | 10/1986 | Japan . | |
| 62-148419 | 9/1987 | Japan . | |
| 0306217 | 12/1988 | Japan | 60/323 |
| 8804358 | 6/1988 | World Int. Prop. O. | 60/299 |

Primary Examiner—Charles A. Marmor
Assistant Examiner—Brian L. Johnson
Attorney, Agent, or Firm—Keck, Mahin & Cate

[57] ABSTRACT

A dual type exhaust system is used in an automobile having an internal combustion engine with transversely mounted front and rear rows of cylinders. Two exhaust pipe assemblies extend from the front and rear rows of cylinders, respectively, toward the back of the car body. The two assemblies are arranged side by side in a space formed in a floor panel. The exhaust pipe assemblies are, respectively, provided with catalytic converters offset in a lengthwise direction of the car body with respect to the space relative to each other so as to be arranged in a straight line in the space.

76 Claims, 12 Drawing Sheets

EXHAUST SYSTEM FOR AUTOMOTIVE ENGINE

BACKGROUND OF THE INVENTION

1. Field of the Invention

The present invention relates to the combination of a car or vehicle and an exhaust system for transverse engines. More particularly, the invention relates to a mechanical structure of a dual type exhaust system for internal combustion engines, such as V-type internal combustion engines or horizontal type internal combustion engines, transversely mounted on vehicles.

2. Description of Related Art

Typically, automotive internal combustion engines, such as V-type internal combustion engines or horizontal type internal combustion engines, are provided with exhaust systems. A dual type exhaust system has a pair of exhaust pipes or exhaust pipe assemblies extending from two rows of cylinders of the engine in a lengthwise direction of the car body, respectively. The exhaust pipes, which are arranged side by side, are provided with catalytic convertors disposed side by side at a same lengthwise location of the exhaust system. Such a mechanical arrangement of the dual type exhaust system is known from, for instance, Japanese Unexamined Utility Model Publication No. 56-159606.

Due to the side-by-side arrangement of two catalytic convertors, compactly installing the dual type exhaust system in what is termed a "floor tunnel" formed or provided in a floor panel structure of the car body is generally somewhat difficult from the view point of space. For this reason, the dual type exhaust system is typically disposed under and suspended by the floor panel structure of the car body.

SUMMARY OF THE INVENTION

A primary object of the present invention is to provide in combination a vehicle and a dual type exhaust system having a pair of exhaust pipes or pipe assemblies with catalytic convertors compactly installed in a floor tunnel of the vehicle or car body.

This object of the invention is accomplished by providing in a car or vehicle a dual type exhaust system, for particular use with transversely mounted internal combustion engines, such as V-type or horizontal type internal combustion engines, comprising a pair of separate exhaust pipe assemblies installed or arranged side by side in a floor tunnel of a floor panel structure of the car body and catalytic converters arranged in the exhaust pipe assemblies, respectively. The catalytic converters of the pair of separate exhaust pipe assemblies are offset in a lengthwise direction of the car body with respect to the floor tunnel relative to each other and arranged in a substantially straight line.

BRIEF DESCRIPTION OF THE DRAWINGS

The above and other objects and features of the present invention will be apparent from the following description of preferred embodiments thereof when considered in conjunction with the appended drawings, wherein similar reference numerals have been used to designate the same or similar elements throughout the drawings, and in which.

DESCRIPTION OF THE PREFERRED EMBODIMENTS

Figure 1:
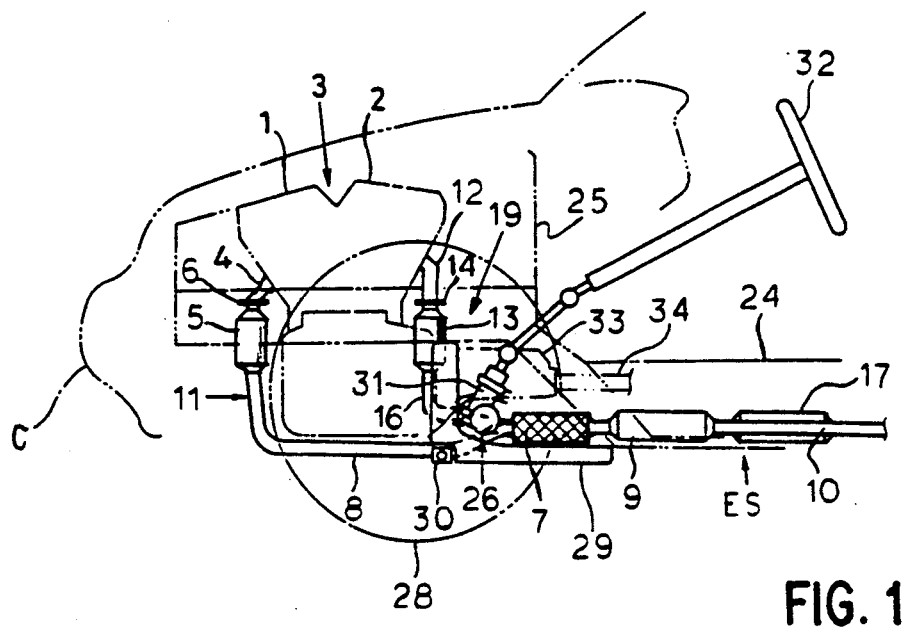
FIG. 1 is a schematic side view showing a layout of a dual type exhaust system in accordance with a preferred embodiment of the present invention.
Figure 2:
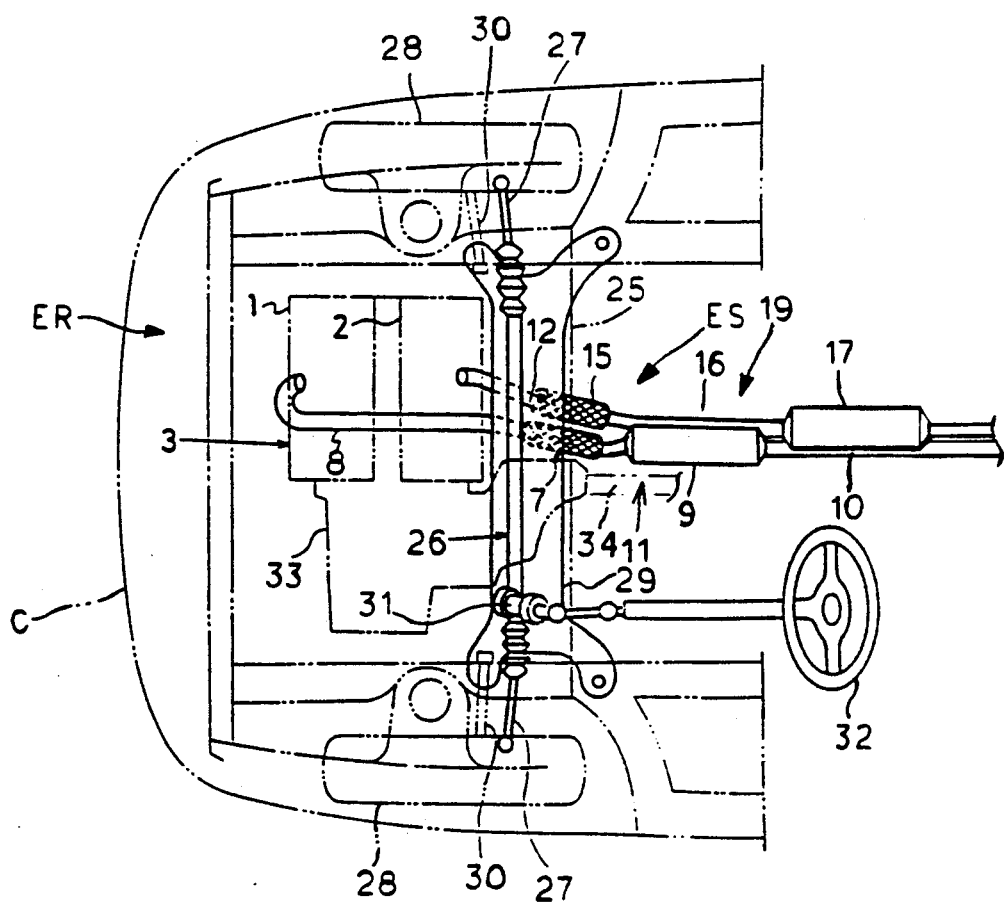
FIG. 2 is a plan view showing the layout of the dual type exhaust system shown in FIG. 1.
Figure 3:
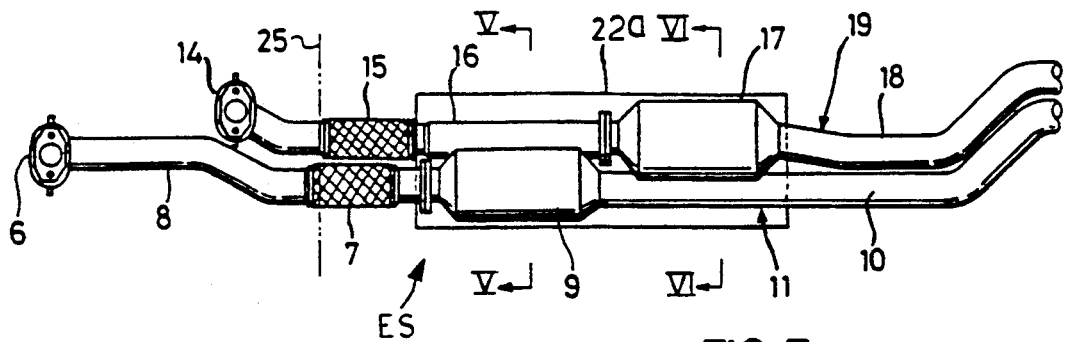
FIG. 3 is a plan view of the dual type exhaust system shown in FIG. 1.
Figure 4:
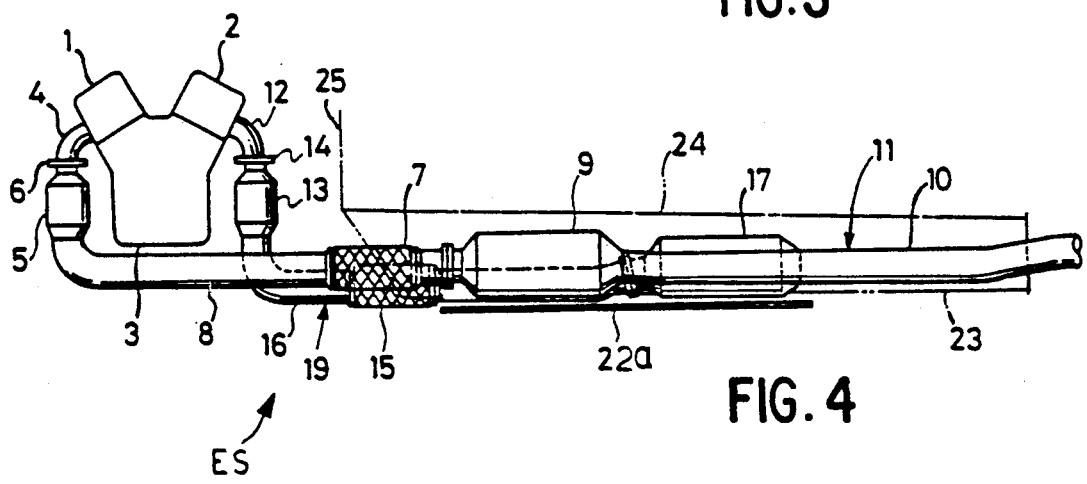
FIG. 4 is a side view of the dual type exhaust system shown in FIG. 1.

Referring to the drawings in detail, in particular to FIGS. 1 to 4, a dual type exhaust system for use with a V-type internal combustion engine transversely mounted on a car is shown. The car or vehicle is of known configuration having three or four wheels and is either front wheel or rear wheel driven or four wheel driven. A V-type internal combustion engine 3, having first and second banks 1 and 2 arranged in a V-formation and mounted in and located in an engine room ER of a car body C (partly shown) in a transverse direction of the car body C, has a dual type exhaust system ES comprising a pair of, or first and second, exhaust pipe assemblies 11 and 19 having exhaust manifolds 4 and 12 connected to the first and second banks 1 and 2, respectively, each being bent down so as to vertically extend downward. The first and second exhaust pipe assemblies 11 and 19, extending in a lengthwise direction of the car body C and located side by side, further comprise front exhaust pipe 8 and 16 connected to the first or second exhaust manifolds 4 and 12, rear exhaust pipes 10 and 18 connected to the front exhaust pipes 8 and 16 through main catalytic converters 9 and 17, respectively.

The first exhaust pipe assembly 11 further includes pre-catalytic converter 5 disposed in the upstream part of the front exhaust pipe 8 vertically bent up and an intermediate flexible portion 7 made of, for instance, a bellows tube. The pre-catalytic converter 5 is directly connected to one end of the first exhaust manifold 4 through a flange 6 of the pre-catalytic converter 5. Similarly, the second exhaust pipe assembly 19 also includes pre-catalytic converter 13 disposed in the upstream part of the front exhaust pipe 16 vertically bent up and an intermediate flexible portion 15 made of, for instance, a bellows tube. The pre-catalytic converter 13 is directly connected to one end of the second exhaust manifold 12 through a flange 14 of the pre-catalytic converter 13.

The front exhaust pipes 8 and 16 of the dual type exhaust system ES extend across and under a rack and pinion type of front steering system 26 which itself extends between front wheels 28. The front steering system 26 is of a well known type and typically includes left and right tie rods 27 and a steering gear box 31 for multiplying turning torque developed by the driver through a steering wheel 32 so the front wheels 28 are turned easily and resist the transfer of road shock to the driver. Front suspension system, located between the car body C and the front wheels 28, includes a front wheel suspension member 29 mounted on the car body C through elastic rubber members (not shown) and left and right suspension arms 30. These systems and their elements are all well known in operation to those skilled in the art.

The first and second exhaust pipe assemblies 11 and 19 are substantially juxtaposed with their major parts located within a floor tunnel 24, which will be described in detail later.

The main catalytic converters 9 and 17 of the first and second exhaust pipe assemblies 11 and 19, having the same elliptical or flattened circular or oblong cross-section, are offset in the lengthwise direction of the car body C with respect to the floor tunnel 24 relative to each other. For example, the main catalytic converter 9 is offset forward with respect to the car body C or the floor tunnel 24 relative to the main catalytic converter 17. Otherwise, the main catalytic converter 17 may be offset rearward with respect to the car body C or the floor tunnel 24 relative to the main catalytic converter 9. However, the main catalytic converters 9 and 17 thus offset are so laid out so as to have their center axes aligned in a straight line. By means of offsetting the main catalytic converters 9 and 17 in the lengthwise direction with respect to the car body C or the floor tunnel 24 relative to each other, the front exhaust pipes 8 and 16 of the first and second exhaust pipe assemblies 11 and 19 are designed and adapted to have substantially the same overall length in the lengthwise direction, thereby providing back pressure uniform for the cylinders of the first and second banks 1 and 2 so as to allow the engine 3 to provide a stable output power.

The major portions of the first and second exhaust pipe assemblies 11 and 19 are located within a bottom opened space 20, generally termed a "floor tunnel," formed in the lengthwise direction in a floor panel structure of the car body C extending rearward from a dash board 25 by which the engine room ER and interior chamber (not shown) are separated. The floor tunnel 24 may be formed by denting a floor panel 23 inside as viewed from the interior chamber of the car body C so as to define the bottom opened space 20 outside the car body C.

Figure 5:
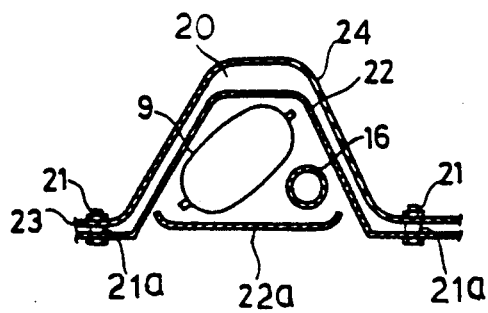
FIG. 5 is a cross sectional view of FIG. 3 taken along line V—V.
Figure 6:
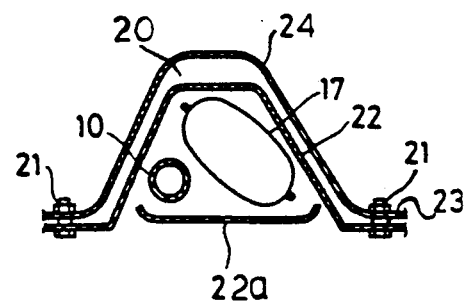
FIG. 6 is a cross sectional view of FIG. 3 taken along line VI—VI.

Referring to FIGS. 5 and 6, the main catalytic converter 9 of the first exhaust pipe assembly 11 is inclined laterally upward at an angle of from about 30 degrees to about 60 degrees and preferably at an angle of 45 degrees on a side adjacent to the front exhaust pipe 16 of the second exhaust pipe assembly 19, as viewed in the lengthwise direction so as to allow to locate the front exhaust pipe 16 of the second exhaust pipe assembly 19 below the main catalytic converter 9. Similarly, the main catalytic converter 17 of the second exhaust pipe assembly 19 is inclined laterally upward at an angle of from about 30 degrees to about 60 degrees and preferably at an angle of 45 degrees on a side adjacent to the rear exhaust pipe 10 of the first exhaust pipe assembly 11, as viewed in the lengthwise direction so as to allow to locate the rear exhaust pipe 10 of the first exhaust pipe assembly 11 below the main catalytic converter 17.

A generally channel-like partition member 22, having a shape similar to the cross-section of the floor tunnel 24 is installed in the space 20 and secured by fasteners 21 to the floor tunnel 24 and serves as an upper heat insulator. For an effective heat insulation, spacers 21a, the partition member 22 and floor tunnel 24 are spaced apart by spacers 21a inserted so as to form an air layer therebetween. A cover member 22a, shaped flat and almost level with the floor panel 23, is secured to the partition member 22 so as to cover the main catalytic converters 9 and 17 of the first and second exhaust pipe assemblies 11 and 19 confined in the floor tunnel 24 and serves as a lower heat insulator.

Arranging the main catalytic converters 9 and 17 of the first and second exhaust pipe assemblies 11 and 19 offset in the lengthwise direction of the car body C and inclined in the opposite directions in the transverse direction of the car body C allows the front and rear exhaust pipes 16 and 10 to be located below the main catalytic converters 9 and 17, respectively, in the floor tunnel 24. This arrangement of the dual type exhaust system ES allows the floor tunnel 24 to be made small and to use effectively the small space 20 in the floor tunnel 24, so as to contribute to providing a large space of interior chamber in the car body C.

Figure 7:
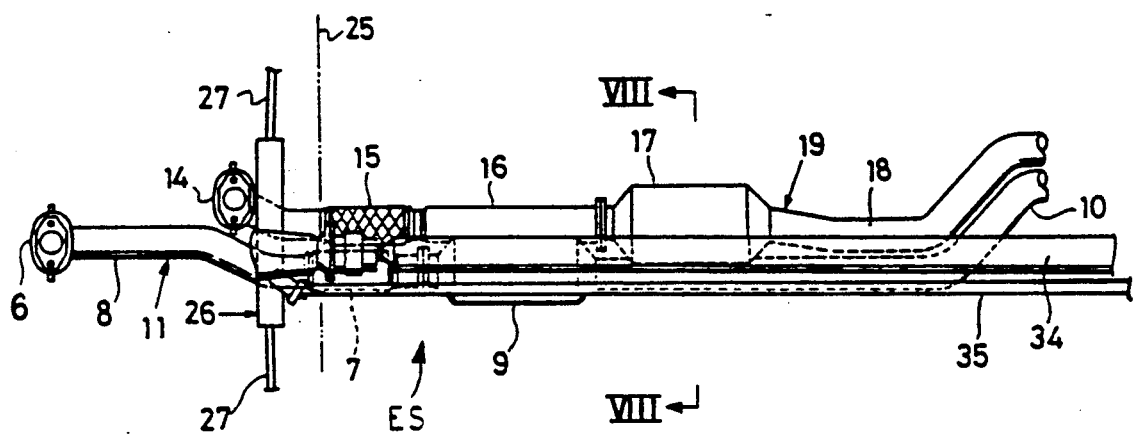
FIG. 7 is a plan view of a dual type exhaust system in accordance with another preferred embodiment of the present invention.
Figure 8:
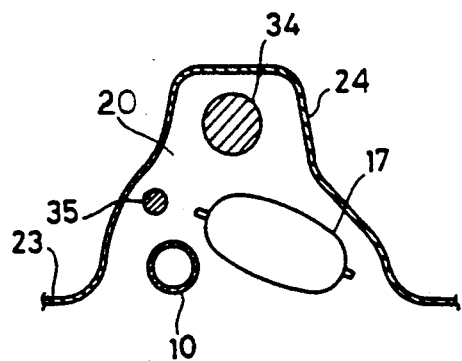
FIG. 8 is a cross sectional view of FIG. 7 taken along line VIII—VIII.

The engine 3 is coupled with a transmission 33 having a propeller shaft 34 by which, in order for a transmission output shaft to drive a differential pinion gear shaft, these two units are connected. Front portion of the propeller shaft 34, if desired, can be located within the floor tunnel 24. As is shown in FIGS. 7 and 8, the dual type exhaust system ES is designed and adapted suitably for four-wheel drive, four-wheel steering cars. A four wheel steering system typically was a four-wheel steering shaft 35 extending from the front steering system 26 so that front and rear wheels are turned independently or all together.

The four wheel steering system and its structural elements are all well known in operation to those skilled in the art, and no description is needed. Front portions of the propeller shaft 34 and four-wheel steering shaft 35, as well as the first and second exhaust pipe assemblies 11 and 19, are located within the floor tunnel 24. In more detail, the propeller shaft 34 is disposed above and between the first and second exhaust pipe assemblies 11 and 19; the four-wheel steering shaft 35 is disposed above the first exhaust pipe assembly 11. Disposing all of these structural elements, such as the exhaust pipe assemblies 11 and 19, the propeller shaft 34 and the four-wheel steering shaft 35, within the space 20 defined by the floor tunnel 24 contributes to widening the interior chamber of the car body C.

Figure 9:
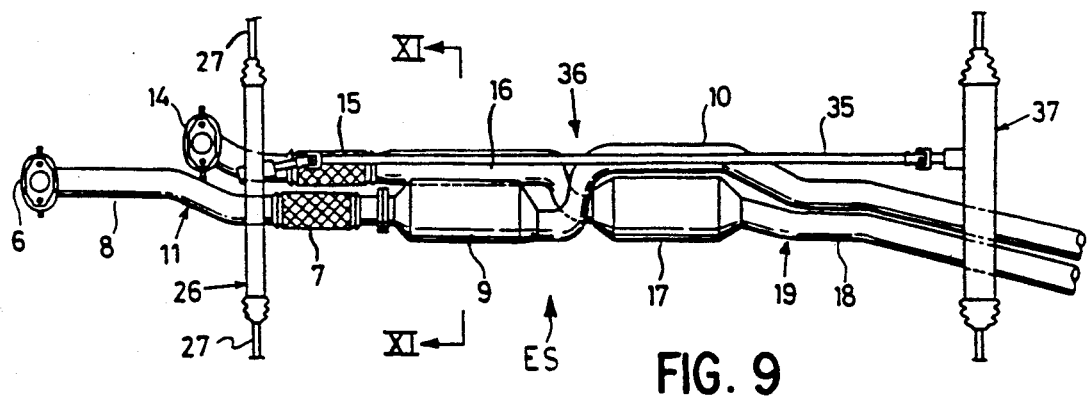
FIG. 9 is a plan view of a dual type exhaust system in accordance with another preferred embodiment of the present invention.
Figure 10:
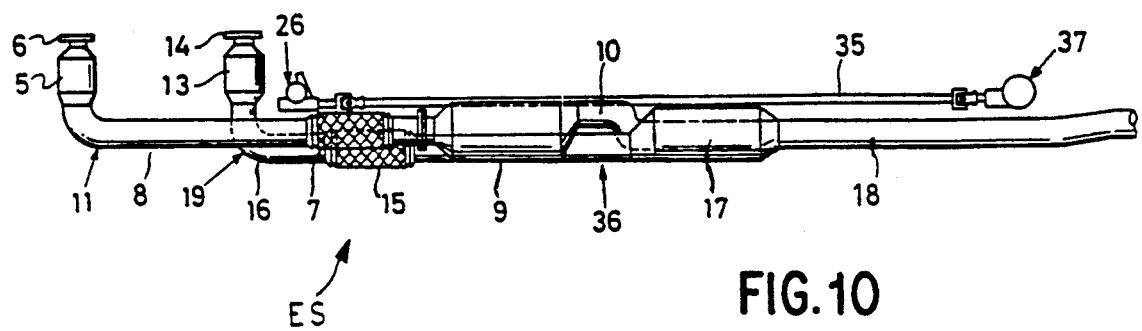
FIG. 10 is a side view of the dual type exhaust system shown in FIG. 9.
Figure 11:
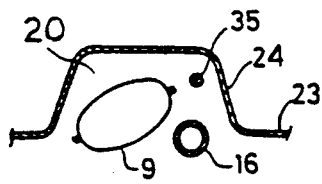
FIG. 11 is a cross sectional view of FIG. 9 taken along line XI—XI.

Referring to FIGS. 9 to 11, a dual type exhaust system ES according to another preferred embodiment of the present invention designed and adapted suitably for a front-engine front-drive, four-wheel steering car which is well known in structure and operation, is shown. A dual type exhaust system has first and second exhaust pipe assemblies 11 and 19 whose structures are almost the same as those of the previous embodiment excepting the arrangement of main catalytic converters 9 and 17.

The main catalytic converters 9 and 17 of the first and second exhaust pipe assemblies 11 and 19 are inclined in the same direction or laterally inwardly up. The main catalytic converters 9 and 17 of the first and second exhaust pipe assemblies 11 and 19 are further offset in the lengthwise direction of the car body C and arranged in a lengthwise straight line. In order to allow the main catalytic converter 17 of the second exhaust pipe assembly 19 to be located behind the main catalytic converter 17 of the first exhaust pipe assembly 11, front exhaust pipe 16 of the second exhaust pipe assembly 19 immediately before the main catalytic converter 17 and rear exhaust pipe 10 of the first exhaust pipe assembly 11 immediately after the main catalytic converter 9 are shaped so as to intersect each other and provide an X-formation 36, as viewed from the above of the drawing, between the main catalytic converters 9 and 17. For provide such an intersecting portion or X-formation 36, the front exhaust pipe 16 of the second exhaust pipe assembly 19 immediately before the main catalytic converter 17 is bent outward; the rear exhaust pipe 10 of the first exhaust pipe assembly 11 immediately after the main catalytic converter 9 is bent down inwardly so as to surround the inner periphery of the main catalytic converter 17 of the second exhaust pipe assembly 19. Major portions of the front exhaust pipe 16 of the second exhaust pipe assembly 11 and the rear exhaust pipe 10 of the first exhaust pipe assembly 11 are aligned in a straight line.

A four wheel steering shaft 35, extending between front and rear steering systems 26 and 37 installed between front and rear wheels (not shown), respectively, is disposed within a bottom opened space 20 defined by a floor tunnel 24 so as to extend over the major portions of the front exhaust pipe 16 of the second exhaust pipe assembly 19 and the rear exhaust pipe 10 of the first exhaust pipe assembly 11.

The exhaust system, having its main catalytic converters 9 and 17 arranged in a straight line and located, together with the four wheel steering shaft 35, in the floor tunnel 24, contributes to providing a lowered height of floor tunnel, so as thereby to allow the interior chamber of the car body C to be widened.

Figure 12:
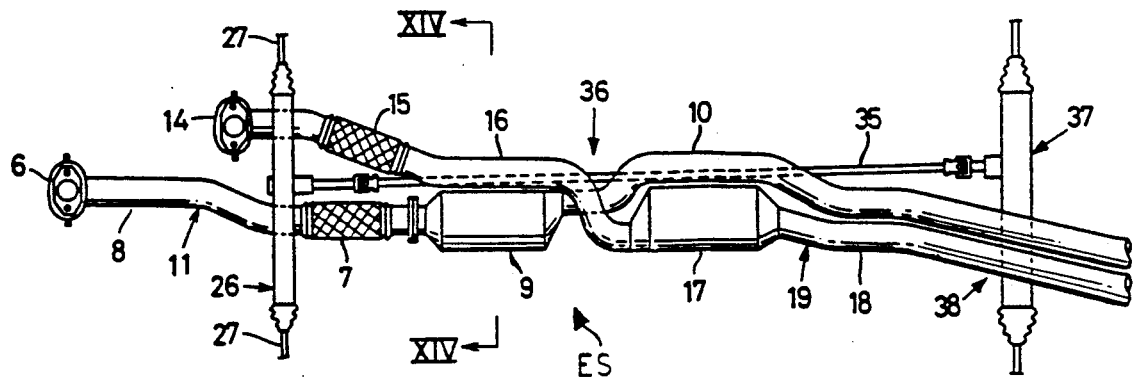
FIG. 12 is a plan view of a dual type exhaust system in accordance with another preferred embodiment of the present invention.
Figure 13:
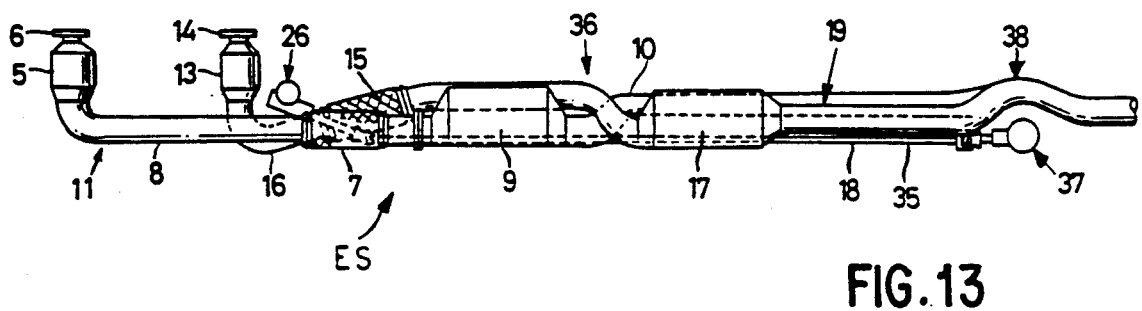
FIG. 13 is a side view of the dual type exhaust system shown in FIG. 12.
Figure 14:
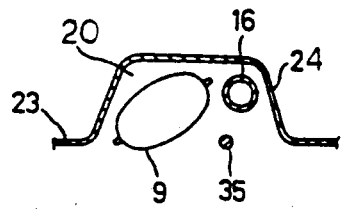
FIG. 14 is a cross sectional view of FIG. 12 taken along line XIV—XIV.

FIGS. 12 to 14 show a variant of the dual type exhaust system ES of the previous embodiment of the present invention shown in FIGS. 9 to 11 as having the four wheel steering shaft 35 extending under the major portions of the front exhaust pipe 16 of the second exhaust pipe assembly 11 and the rear exhaust pipe 10 of the first exhaust pipe assembly 11.

Main catalytic converters 9 and 17 of the first and second exhaust pipe assemblies 11 and 19, are offset in a lengthwise direction of the car body C and arranged in a straight line. In order to allow the main catalytic converter 17 of the second exhaust pipe assembly 19 to be located behind the main catalytic converter 17 of the first exhaust pipe assembly 11 in this variant, the front exhaust pipe 16 of the second exhaust pipe assembly 19 just before the main catalytic converter 17 and the rear exhaust pipe 10 of the first exhaust pipe assembly 11 just after the main catalytic converter 9 are shaped to intersect each other so as to provide an X-formation 36, as viewed from the top and side, between the main catalytic converters 9 and 17. The intersecting portion or X-formation 36 is provided by bending the front exhaust pipe 16 of the second exhaust pipe assembly 19 before the main catalytic converter 17 outward down and the rear exhaust pipe 10 of the first exhaust pipe assembly 11 after the main catalytic converter 9 inward up.

The rear exhaust pipes 10 and 18 of the first and second exhaust pipe assemblies 11 and 19 are curved near their rear ends so as to cross over the rear steering system 37 extending between rear wheels (not shown).

Four wheel steering shaft 35, extending in a straight line between front and rear steering systems 26 and 37, is disposed under the major portions of the front exhaust pipe 16 of the second exhaust pipe assembly 19 and the rear exhaust pipe 10 of the first exhaust pipe assembly 11.

Figure 15:
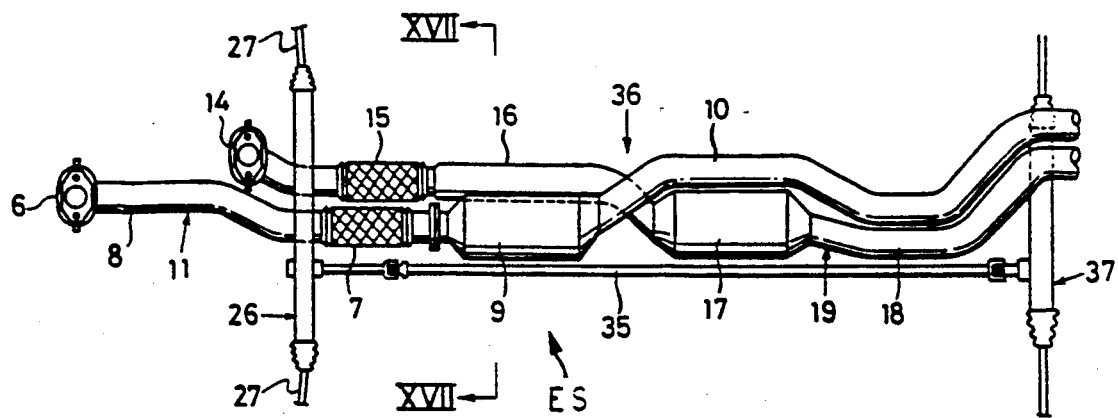
FIG. 15 is a plan view of a dual type exhaust system in accordance with another preferred embodiment of the present invention.
Figure 16:
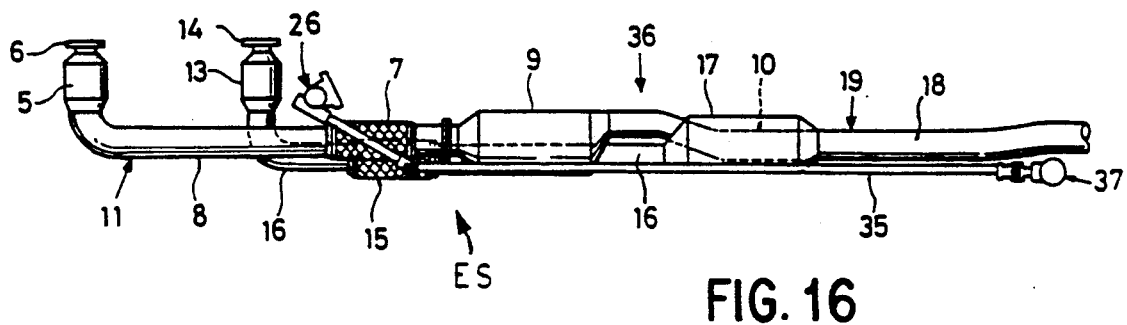
FIG. 16 is a side view of the dual type exhaust system shown in FIG. 15.
Figure 17:
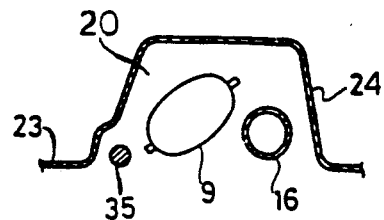
FIG. 17 is a cross sectional view of FIG. 15 taken along line XVII—XVII.

FIGS. 15 to 17 show another variant of the dual type exhaust system ES of the previous embodiment of the present invention shown in FIGS. 9 to 11. The dual type exhaust system ES has substantially the same structure as shown in FIG. 12 to 14, but is located within the floor tunnel 24 together with a four wheel steering shaft 35 arranged along the outer sides of the main catalytic converters 9 and 17 aligned in a straight line.

FIGS. 18 to 21 show a variant of the dual type exhaust system of the previous embodiment of the present invention shown in FIGS. 1 to 4 as having the intermediate flexible portion 7 of the first exhaust pipe assembly 11 located as close to the first bank 1 of the engine 3 as possible. The intermediate flexible portion 7 disposed in the straight portion of the front exhaust pipe 8 of the first exhaust pipe assembly 11 is located right below the engine 3 in the engine room ER. The intermediate flexible portion 15 disposed in the straight portion of the front exhaust pipe 16 of the second exhaust pipe assembly 19 is disposed below near the dash panel 25 of the car body C.

Figure 18:
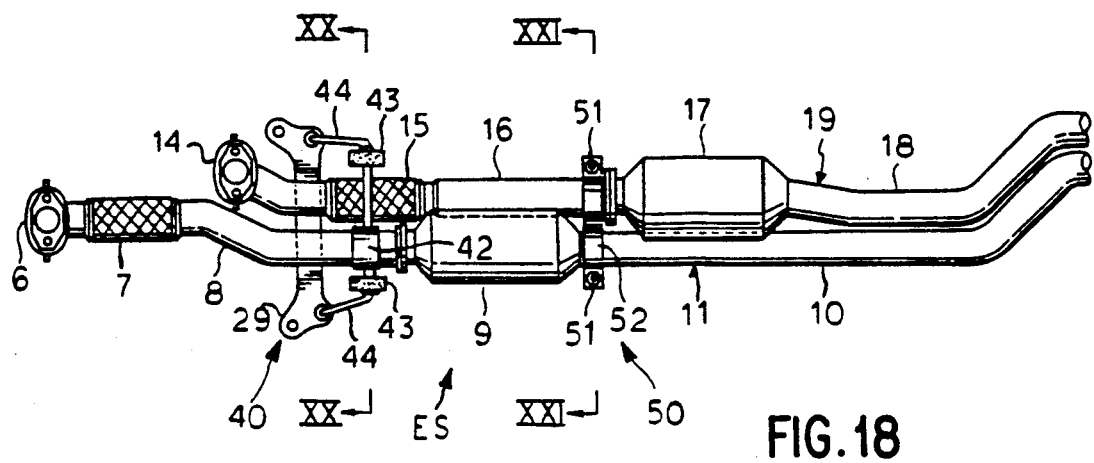
FIG. 18 is a plan view of a dual type exhaust system in accordance with another preferred embodiment of the present invention.
Figure 19:
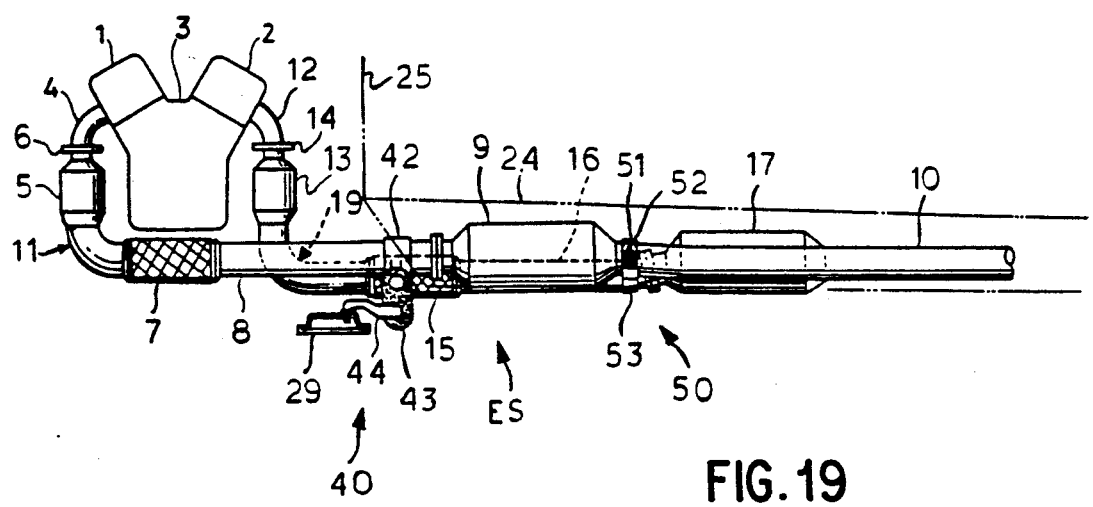
FIG. 19 is a side view of the dual type exhaust system shown in FIG. 18.
Figure 20:
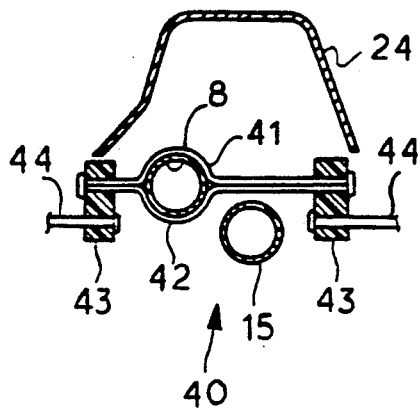
FIG. 20 is a cross sectional view of FIG. 18 taken along line XX—XX.

The exhaust system ES is connected to or supported by the front wheel suspension member 29 by mounting the first exhaust pipe assembly 11 on the front wheel suspension member 29 as is shown in FIGS. 18 and 19. Elastic mounting structure 40 comprises upper and lower brackets 41 and 42 form mounting the front exhaust pipe 8 of the first exhaust pipe assembly 11 between the intermediate flexible portion 7 and the main catalytic converter 9, a pair of elastic mount blocks 43 holding opposite ends of the upper and lower brackets 41 and 42, and a suspension rod 44 attached at one end thereof to each elastic mount block 43. Each suspension rod 44 is connected at its other end to the suspension member 29.

Figure 21:
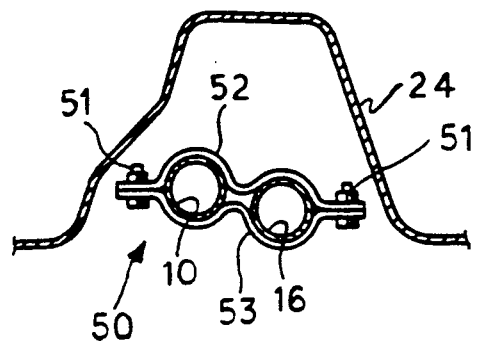
FIG. 21 is a cross sectional view of FIG. 18 taken along line XXI—XXI.

The rear and front exhaust pipes 10 and 16 of the first and second exhaust pipe assemblies 11 and 19 between the main catalytic converters 9 and 16 are rigidly connected together by means of a rigid connecting structure 50. The rigid connecting structure 50 comprises upper and lower brackets 52 and 53 secured together by bolt and nut fastening means 51 so as to firmly grasp the rear and front exhaust pipes 10 and 16 therebetween, as is shown in FIG. 21.

Figure 22:
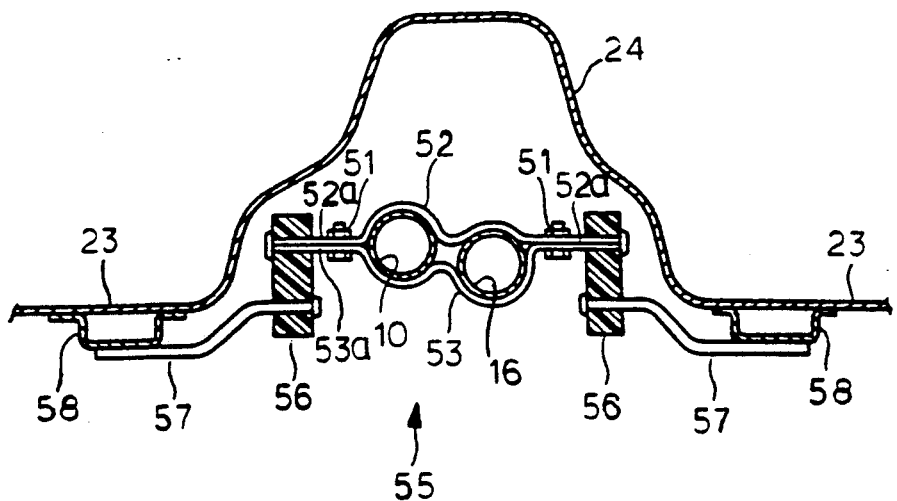
FIG. 22 is a cross sectional view, similar to FIG. 21, of a variant of the dual type exhaust system shown in FIG. 18.
Figure 23:
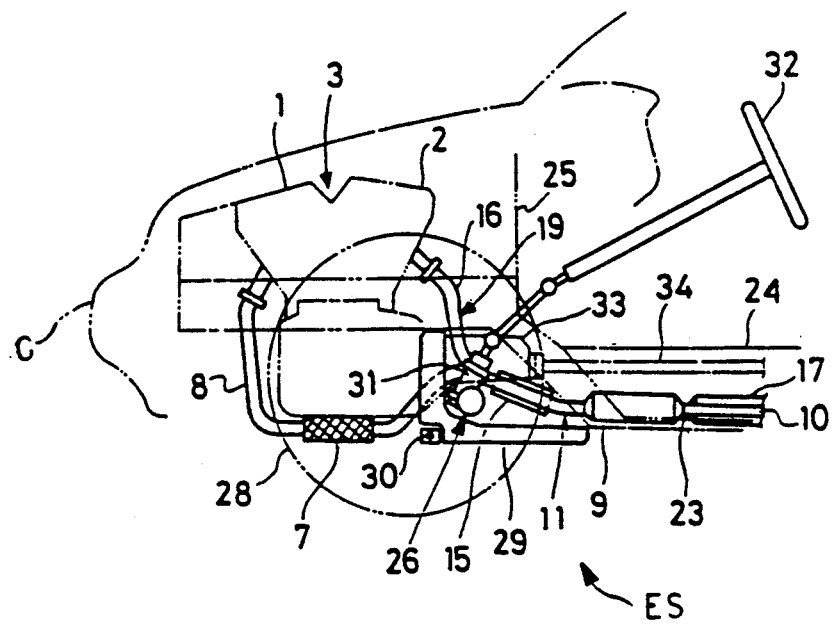
FIG. 23 is a schematic side view showing a layout of a dual type exhaust system in accordance with another preferred embodiment of the present invention.
Figure 24:
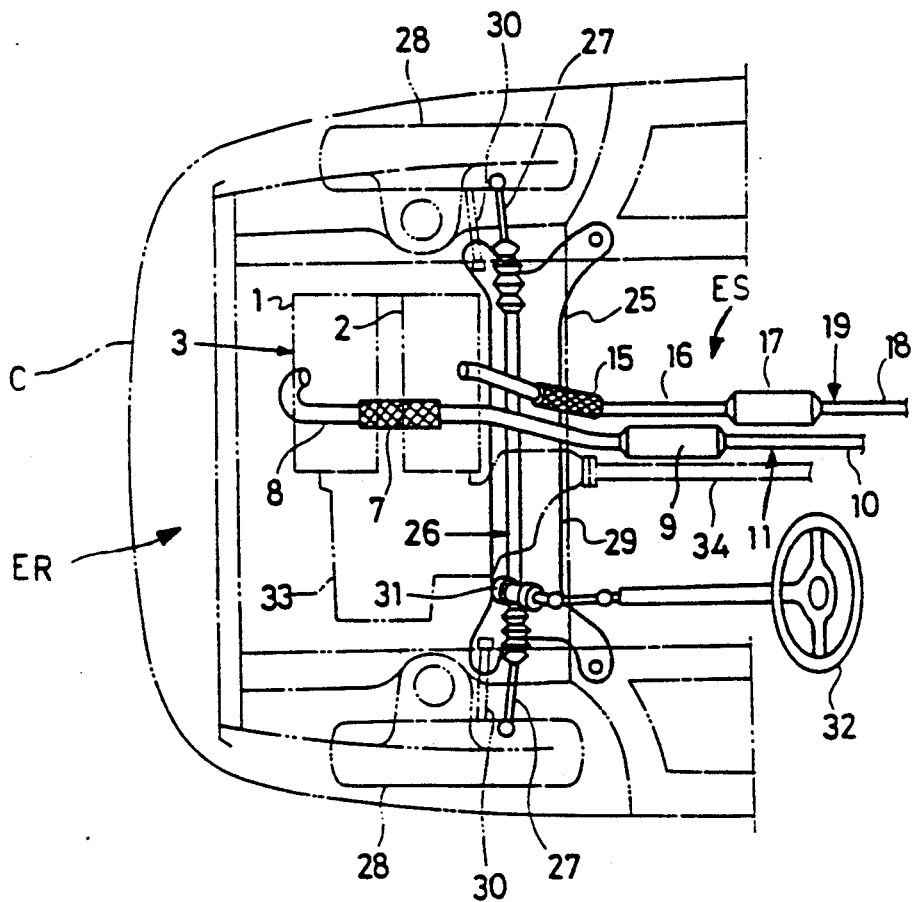
FIG. 24 is a plan view showing the layout of the dual type exhaust system shown in FIG. 23.
Figure 25:
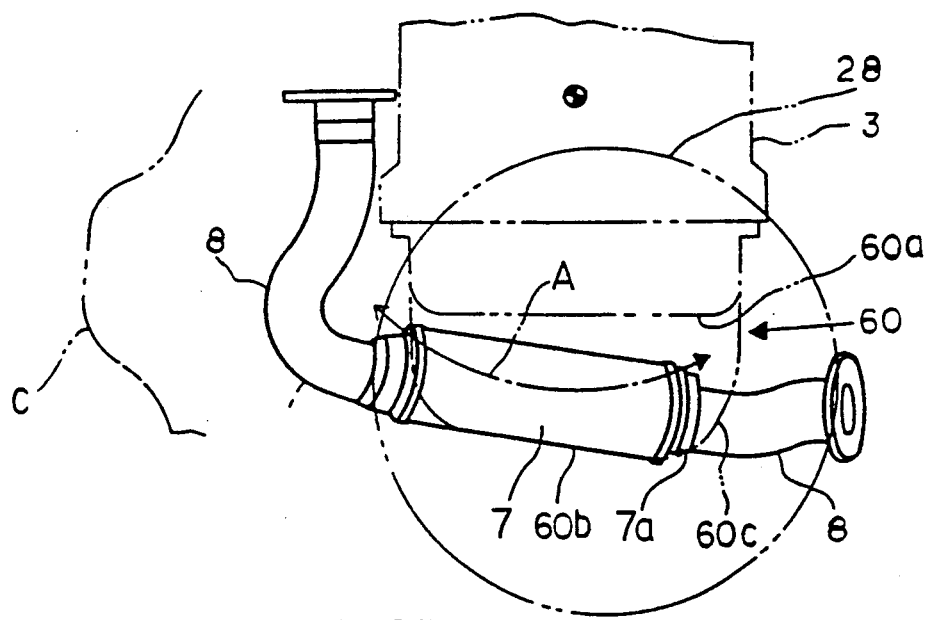
FIG. 25 is an enlarged side view illustrating the detail of location of a flexible pipe portion of the dual type exhaust system shown in FIG. 23.
Figure 26:
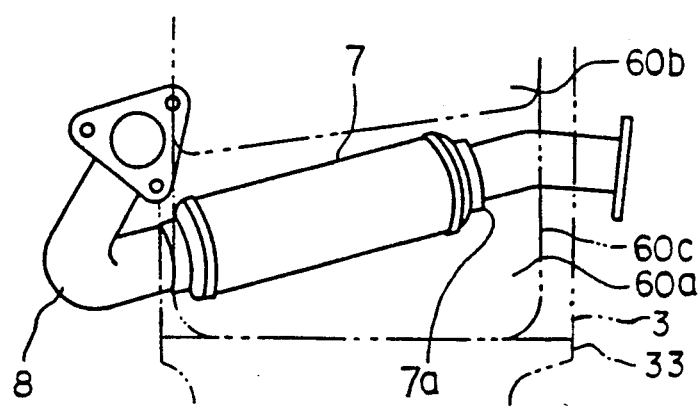
FIG. 26 is an enlarged plan view illustrating the detail of location of the flexible pipe portion of FIG. 25.

The rigid connecting structure 50 may be supported by or mounted on the car body C through an elastic mounting structure 55 as is shown in FIG. 22. That is, the upper and lower brackets 52 and 53 are formed with lateral extensions 52a and 53a. The rigid connecting structure 50 is mounted at its opposite ends or lateral extensions 52a and 53a on a pair of elastic mount blocks 56, each of which is firmly held by a suspension rod 57 rigidly secured to the floor panel 23.

Locating the intermediate flexible portions 7 and 15 close to the first and second banks 1 and 2, respectively, allows the main catalytic converters 9 and 17 of the first and second exhaust pipe assemblies 11 and 19 to be located considerably close to the engine 3, so as thereby to improve the property of cold emission.

Moreover, because of the elastic mounting structures 40 and 55, the exhaust system ES can considerably reduced noise, vibration and harshness.

In order for the exhaust system having intermediate flexible portions not to suffer vibration generated in the engine body, the intermediate flexible portions are advantageous to be installed near the upstream ends of the front exhaust pipes or located as close to the first and second banks of the engine body as possible. However, since locating the intermediate flexible portions closely to the banks of the engine body makes them suffer heat carried by burned exhaust gas, the intermediate flexible portions are preferably located as far away from the banks as possible. For this reason, one of the intermediate flexible portion, which is disposed in the front exhaust pipe of the first exhaust pipe assembly extending under the engine body to the first bank, is preferred to be located under the engine body. Another problem of locating the intermediate flexible portion, disposed in the front exhaust pipe of the first exhaust pipe assembly, is that the intermediate flexible portion is exposed to snow melting agent containing corrosive salt in winter and as the result, apt to corrode with the snow melting agent splashed on by front wheels.

Referring to FIGS. 23 to 26, a dual type exhaust system embodied in consideration of the above is shown, comprising first and second exhaust pipe assemblies 11 and 19 with front exhaust pipes 8 and 16 extending across over the front steering system 26. A stepped oil pan 60, consisting of two oil pan sections, namely a shallow oil pan section 60a located closely to the transmission 33 attached to the side of the engine 3 and a deep oil pan section 60b located remotely from the transmission 33, is attached to an under surface of the engine 3.

The intermediate flexible portion 7 of the first exhaust pipe assembly 11 is disposed in the front exhaust pipe 8 at approximately the middle and located under the shallow oil pan section 60a in the lengthwise direction and between the transmission 33 and the deep oil pan section 60b under the engine 3 in the transverse direction, with its rear end 7a positioned within the bottom contour 60c of the oil pan 60.

Locating the front exhaust pipes 8 and 16 across over the front steering system 26 provides the easiness of installation of the dual type exhaust system ES. In addition, the intermediate flexible portion 7 of the first exhaust pipe assembly 11 located between the transmission 33 and the deep oil pan section 60b under the engine 3 is prevented by the stepped oil pan 60 from snow melting agent splashed on by the front wheels 28, so as not to corrode with the corrosive salt contained in the snow melting agent. Moreover, since the intermediate flexible portion 7 of the first exhaust pipe assembly 11, although suffering expansion and contraction only in a lengthwise direction accompanying vibration of the engine 3 shown by an arrow A, is free from torsion and turn, it efficiently absorbs vibration of the intake system ES, so as thereby to improve its structural strength.

Figure 27:
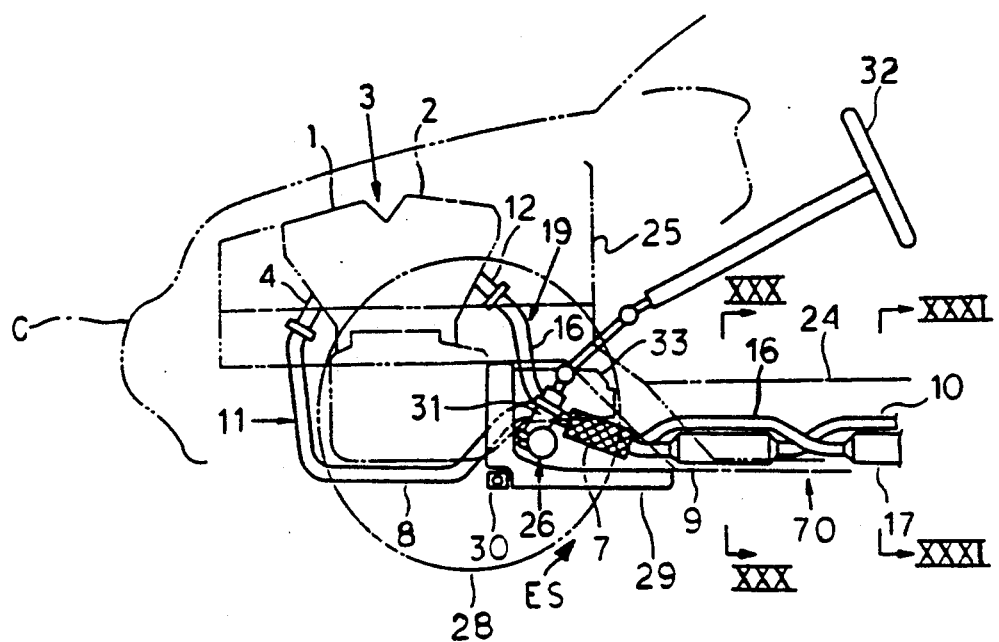
FIG. 27 is a schematic side view showing a layout of a dual type exhaust system in accordance with another embodiment of the present invention.
Figure 28:
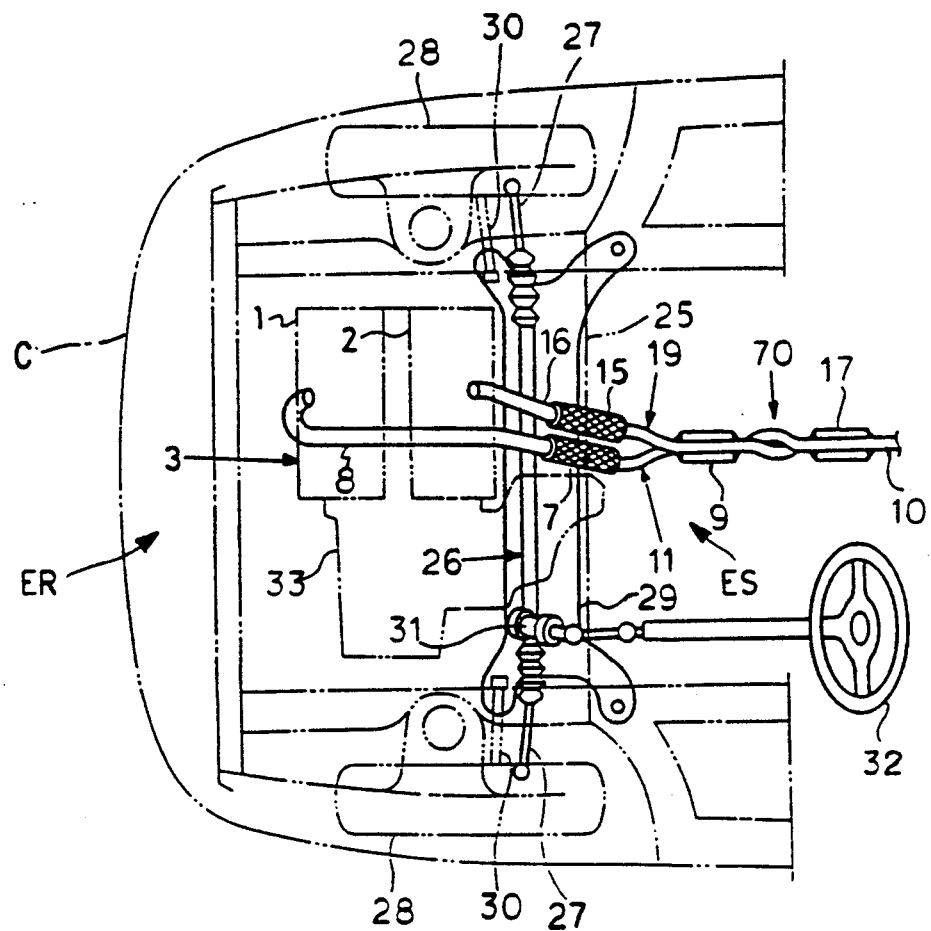
FIG. 28 is a plan view showing the layout of the dual type exhaust system shown in FIG. 27.

Referring to FIGS. 27 and 28, a dual type exhaust system ES in accordance another preferred embodiment of the present invention is shown. This system includes first and second exhaust pipe assemblies 11 and 19 with front exhaust pipes 8 and 16 extending across and over the front steering system 26. The first exhaust pipe assembly 11 includes a main catalytic converter 9 interposed between the front and rear exhaust pipes 8 and 10. Similarly, the second exhaust pipe assembly 19 includes a main catalytic converter 17 interposed between the front and rear exhaust pipes 16 and 18.

The first and second exhaust pipe assemblies 11 and 19 are substantially juxtaposed side by side with their major portions located within the floor tunnel 24.

The main catalytic converters 9 and 17 of the first and second exhaust pipe assemblies 11 and 19 are offset in the lengthwise direction of the car body C relative to each other and arranged in a lengthwise straight line. For example, the main catalytic converter 9 is offset forward with respect to the car body C relative to the main catalytic converter 17 or vice versa. By means of offsetting the main catalytic converters 9 and 17 in the lengthwise direction, the front exhaust pipes 8 and 16 of the first and second exhaust pipe assemblies 11 and 19 can be designed and adapted to have the same overall length in the lengthwise direction, thereby providing back pressure uniform for the cylinders of the first and second banks 1 and 2 so as to allow the engine to provide a stable output power.

The major portions of the first and second exhaust pipe assemblies 11 and 19 are located within the bottom opened space 20 of the floor tunnel, formed in the lengthwise direction in a floor panel structure of the car body CB extending rearward from the dash board 25.

Figure 29:
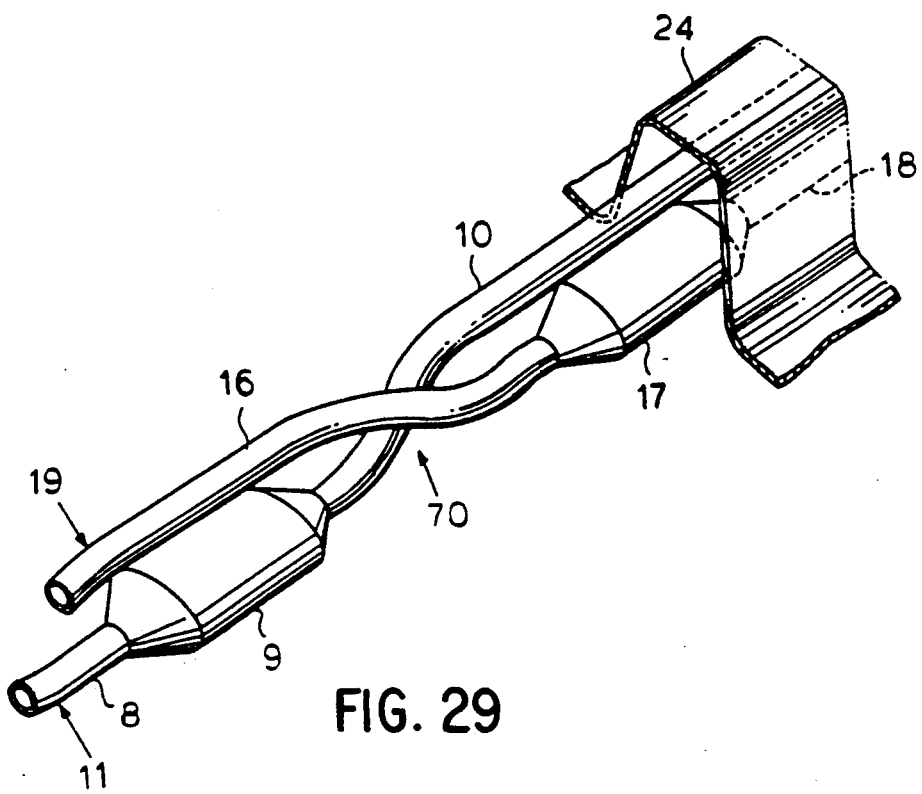
FIG. 29 is a perspective view illustrating part of the dual type exhaust system shown in FIG. 27.
Figure 30:
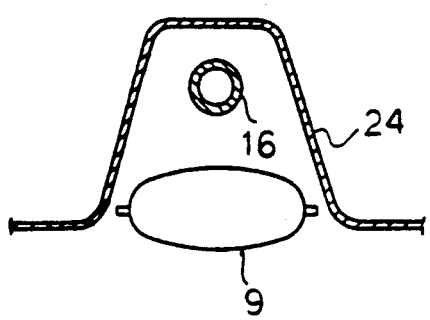
FIG. 30 is a cross sectional view of FIG. 27 taken along line XXX—XXX.
Figure 31:
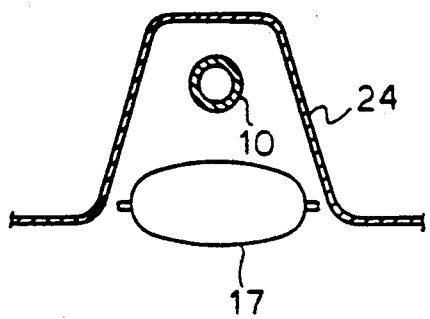
FIG. 31 is a cross sectional view of FIG. 27 taken along line XXXI—XXXI.

As is shown in detail in FIGS. 29 to 31, the main-catalytic converters 9 and 17 of the first and second exhaust pipe assemblies 11 and 19, each having the same elliptical or flattened circular or oblong cross-section, are disposed with their longer axes in the same horizontal plane perpendicular to the surface of the drawing. The main catalytic converter 9 of the first exhaust pipe assembly 11 is located under the front exhaust pipe 16 of the second exhaust pipe assembly 19 with the long axis of the elliptical cross section in a horizontal plane; the main catalytic converter 17 of the second exhaust pipe assembly 19 is located under the rear exhaust pipe 10 of the first exhaust pipe assembly 11 the long axis of the elliptical cross section in the same horizontal plane as that in which the long axis of the elliptical cross section lays. To allow the main-catalytic converters 9 and 17 to be located in the same horizontal plane, the front exhaust pipe 16 of the second exhaust pipe assembly 19 and rear exhaust pipe 10 of the first exhaust pipe assembly 11 are bent to intersect each other so as to form an X-formation 70 between the main catalytic converters 9 and 17.

This arrangement of the dual type exhaust system allows not only to make the floor tunnel 24 small but also to use effectively the bottom opened space 20 in the floor tunnel 24, so as to contribute to providing the interior chamber of the car body C with a large space. Furthermore, since this arrangement of the dual type exhaust system ES allows to locate the main catalytic converters 9 and 17 away from the floor panel 23, heat carried by the main catalytic converters 9 and 17 is not transmitted to the interior chamber of the car body C.

It is to be understood that although the present invention has been described in detail with respect to the preferred embodiments thereof, various other embodiments and variants are possible which fall within the spirit and scope of the invention, and such embodiments and variants are intended to be covered by the following claims.

What is claimed is:

1. A dual type exhaust system for use with an internal combustion engine with front and rear rows of cylinders transversely mounted in a front engine room of a car body wherein a floor panel structure is formed with a bottom opened space for accommodating exhaust pipes, said dual type exhaust system comprising:
   a pair of exhaust pipe assemblies, one of said pair of exhaust pipe assemblies extending from the front row of cylinders and the other of said pair of exhaust pipe assemblies extending from the rear row of cylinders toward a back of said car body, the exhaust pipe assemblies being arranged side by side in said bottom opened space; and
   a pair or catalytic converters, only one of said pair of catalytic converters disposed in a interconnected with each exhaust pipe assembly of said pair of exhaust pipe assemblies;
   said catalytic converters being offset in a lengthwise direction of said car body with respect to said bottom opened space relative to each other.

2. A dual type exhaust system as defined in claim 1, wherein each pair of exhaust pipe assemblies comprises front and rear exhaust pipes between which said catalytic converter is interposed.

3. A dual type exhaust system as defined in claim 2, wherein said catalytic converters have a generally oblong cross-section, said catalytic converter of one of said pair of exhaust pipe assemblies being inclined in a first direction to overhang said front exhaust pipe of another of said pair of exhaust pipe assemblies and said catalytic converter of the other of said pair of exhaust pipe assemblies being inclined in a second direction to overhang said rear exhaust pipe of said one of said pair of exhaust pipe assemblies.

4. A dual type exhaust system as defined in claim 3, wherein said bottom opened space accommodates therein a propeller shaft of a rear wheel drive power train extending over said pair of exhaust pipe assemblies.

5. A dual type exhaust system as defined in claim 3, wherein said bottom opened space accommodates therein a rear steering shaft of a four-wheel steering system extending over one of said pair of exhaust pipe assemblies.

6. A dual type exhaust system as defined in claim 3, wherein said front exhaust pipe of one of said pair of exhaust pipe assemblies and said rear exhaust pipe of another of said pair of exhaust pipe assemblies are shaped to intersect each other and form a generally X-like formation between said pair of catalytic converters so that said catalytic converters are arranged with respective center axes aligned in a straight line in said lengthwise direction.

7. A dual type exhaust system as defined in claim 6, wherein said front exhaust pipe of one of said pair of catalytic converters and said rear exhaust pipe of another of said catalytic converters are arranged in a straight line in said lengthwise direction on a same side of said catalytic converters arranged in a straight line in said lengthwise direction.

8. A dual type exhaust system as defined in claim 7, wherein said bottom opened space accommodates therein a rear steering shaft of a four-wheel steering system extending over said front exhaust pipe and said rear exhaust pipe arranged in a straight line in said lengthwise direction.

9. A dual type exhaust system as defined in claim 7, wherein said bottom opened space accommodates therein a rear steering shaft of a four-wheel steering system extending under said front exhaust pipe and said rear exhaust pipe arranged in a straight line in said lengthwise direction.

10. A dual type exhaust system as defined in claim 7, wherein said bottom opened space accommodates therein a rear steering shaft of a four-wheel steering system extending on a side remote from said one side with respect to said catalytic converters arranged in a straight line in said lengthwise direction.

11. A dual type exhaust system as defined in claim 6, wherein said first and second directions are the same as each other.

12. A dual type exhaust system as defined in claim 3, wherein said first and second directions are opposite to each other.

13. A dual type exhaust system as defined in claim 2, wherein said front exhaust pipe of one of said pair of catalytic converters and said rear exhaust pipe of another of said catalytic converters are arranged in a straight line in said lengthwise direction on a same side of said catalytic converters arranged in a straight line in said lengthwise direction.

14. A dual type exhaust system as defined in claim 13, wherein said catalytic converters have a generally oblong cross-section, said catalytic converter of one of said pair of exhaust pipe assemblies being inclined in one direction to overhang said front exhaust pipe of another of said pair of exhaust pipe assemblies and said catalytic converter of the other of said pair of exhaust pipe assemblies being inclined in another direction opposite to said one direction to overhang said rear exhaust pipe of said one of said pair of exhaust pipe assemblies.

15. A dual type exhaust system as defined in claim 13, wherein said catalytic converters have a generally oblong cross-section, said catalytic converter of one of said pair of exhaust pipe assemblies being inclined in one direction to overhang said front exhaust pipe of another of said pair of exhaust pipe assemblies and said catalytic converter of the other of said pair of exhaust pipe assemblies being inclined in the same direction as said one direction to overhang said rear exhaust pipe of said one of said pair of exhaust pipe assemblies.

16. A dual type exhaust system as defined in claim 2, further comprising a flexible portion interposed in said front exhaust pipe of each said exhaust pipe assembly.

17. A dual type exhaust system as defined in claim 16, wherein said flexible portion is made of a bellows.

18. A dual type exhaust system as defined in claim 17, wherein said flexible portion of one of said pair of exhaust pipe assemblies is located under said internal combustion engine.

19. A dual type exhaust system as defined in claim 18, further comprising an oil pan attached to said engine with a stepped bottom which provides under said internal combustion engine a shallow oil pan section adjacent to a transmission connected to said internal combustion engine and a deep oil pan section remote from said transmission so as to locate said flexible portion of said one of said pair of exhaust pipe assemblies under said oil pan between said deep oil pan section and said transmission.

20. A dual type exhaust system as defined in claim 19, wherein a rear end of said flexible portion of said one of said pair of exhaust pipe assemblies is located within a contour of said stepped bottom.

21. A dual type exhaust system as defined in claim 17, wherein both of said flexible portions of said pair of exhaust pipe assemblies are located between said internal combustion engine and said catalytic converters, respectively.

22. A dual type exhaust system as defined in claim 16, wherein said catalytic converters have a generally oblong cross-section, said catalytic converter of one of said pair of exhaust pipe assemblies being inclined in a first direction to overhang said front exhaust pipe of another of said pair of exhaust pipe assemblies and said catalytic converter of the other of said pair of exhaust pipe assemblies being inclined in a second direction to overhang said rear exhaust pipe of said one of said pair of exhaust pipe assemblies.

23. A dual type exhaust system as defined in claim 22, wherein said first and second directions are the same as each other.

24. A dual type exhaust system as defined in claim 22, wherein said first and second directions are opposite to each other.

25. A dual type exhaust system as defined in claim 16, wherein said pair of exhaust pipe assemblies are tightly connected between said catalytic converters by rigid fastening means and fixed to a front wheel suspension member through an elastic member connected to at least one of said front exhaust pipes.

26. A dual type exhaust system as defined in claim 25, wherein said rigid fastening means is connected to said floor panel structure through an elastic member.

27. A dual type exhaust system as defined in claim 2, wherein said front exhaust pipe of one of said pair of exhaust pipe assemblies and said rear exhaust pipe of another of said pair of exhaust pipe assemblies are shaped to intersect each other and form a generally X-like formation between said pair of catalytic converters so that said catalytic converters are arranged in a same horizontal plane in said lengthwise direction.

28. A dual type exhaust system as defined in claim 27, wherein said front exhaust pipe of one of said pair of exhaust pipe assemblies extends over said catalytic converter of said other of said pair of exhaust pipe assemblies and said rear exhaust pipe of said other of said pair of exhaust pipe assemblies extends over said catalytic converter of said one of said pair of exhaust pipe assemblies.

29. A dual type exhaust system as defined in claim 28, wherein said catalytic converters have a generally elliptical cross section.

30. A dual type exhaust system as defined in claim 29, wherein each said catalytic converter is arranged with a long axis in said horizontal plane.

31. A dual type exhaust system as defined in claim 2, wherein said front exhaust pipes of said pair of exhaust pipe assemblies extend across a steering rack of a front steering system.

32. A dual type exhaust system as defined in claim 31, wherein said front exhaust pipes of said pair of exhaust pipe assemblies extend across and under said steering rack.

33. A dual type exhaust system as defined in claim 31, wherein said front exhaust pipes of said pair of exhaust pipe assemblies extend across and over said steering rack.

34. A dual type exhaust system as defined in claim 31, wherein said front exhaust pipe of one of said pair of catalytic converters and said rear exhaust pipe of another of said catalytic converters are arranged in a straight line in said lengthwise direction on a same side of said catalytic converters arranged in a straight line in said lengthwise direction.

35. A dual type exhaust system as defined in claim 31, wherein said catalytic converters have a generally oblong cross-section, said catalytic converter of one of said pair of exhaust pipe assemblies being inclined in a first direction to overhang said front exhaust pipe of another of said pair of exhaust pipe assemblies and said catalytic converter of the other of said pair of exhaust pipe assemblies being inclined in a second direction to overhang said rear exhaust pipe of said one of said pair of exhaust pipe assemblies.

36. A dual type exhaust system as defined in claim 35, wherein said first and second directions are the same as each other.

37. A dual type exhaust system as defined in claim 35, wherein said first and second directions are opposite to each other.

38. A dual type exhaust system as defined in claim 31, further comprising a flexible portion interposed in said front exhaust pipe of each said exhaust pipe assembly.

39. In combination, a car having an internal combustion engine with front and rear rows of cylinders transversely mounted in a front engine room of the car body and having a floor panel structure formed with a bottom opened space for accommodating exhaust pipes, and a dual type exhaust system comprising:
- a pair of exhaust pipe assemblies, one of said pair of exhaust pipe assemblies extending from the front row of cylinders and the other of said pair of exhaust pipe assemblies extending form the rear row of cylinders toward a back of said car body, the exhaust pipe assemblies being arranged side by side in said bottom opened space; and
- a pair of catalytic converters, only one of said pair of catalytic converters disposed in and interconnected with each exhaust pipe assembly of said pair of exhaust pipe assemblies;
said catalytic converters being offset in a lengthwise direction of said car body with respect to said bottom opened space relative to each other.

40. The combination as defined in claim 39, wherein each pair of exhaust pipe assemblies comprises front and rear exhaust pipes between which said catalytic converter is interposed.

41. The combination as defined in claim 40, wherein said catalytic converters have a generally oblong cross-section, said catalytic converter of one of said pair of exhaust pipe assemblies being inclined in a first direction to overhang said front exhaust pipe of another of said pair of exhaust pipe assemblies and said catalytic converter of the other of said pair of exhaust pipe assemblies being inclined in a second direction to overhang said rear exhaust pipe of said one of said pair of exhaust pipe assemblies.

42. The combination as defined in claim 41, wherein said bottom opened space accommodates therein a propeller shaft of a rear wheel drive power train extending over said pair of exhaust pipe assemblies.

43. The combination as defined in claim 41, wherein said bottom opened space accommodates therein a rear steering shaft of a four-wheel steering system extending over one of said pair of exhaust pipe assemblies.

44. The combination as defined in claim 41, wherein said front exhaust pipe of one of said pair of exhaust pipe assemblies and said rear exhaust pipe of another of said pair of exhaust pipe assemblies are shaped to intersect each other and form a generally X-like formation between said pair of catalytic converters so that said catalytic converters are arranged with respective center axes aligned in a straight line in said lengthwise direction.

45. The combination as defined in claim 44, wherein said front exhaust pipe of one of said pair of catalytic converters and said rear exhaust pipe of another of said catalytic converters are arranged in a straight line in said lengthwise direction on a same side of said catalytic converters arranged in a straight line in said lengthwise direction.

46. The combination as defined in claim 45, wherein said bottom opened space accommodates therein a rear steering shaft of a four-wheel steering system extending over said front exhaust pipe and said rear exhaust pipe arranged in a straight line in said lengthwise direction.

47. The combination as defined in claim 45, wherein said bottom opened space accommodates therein a rear steering shaft of a four-wheel steering system extending under said front exhaust pipe and said rear exhaust pipe arranged in a straight line in said lengthwise direction.

48. The combination as defined in claim 45, wherein said bottom opened space accommodates therein a rear steering shaft of a four-wheel steering system extending on a side remote from said one side with respect to said catalytic converters arranged in a straight line in said lengthwise direction.

49. The combination as defined in claim 44, wherein said first and second directions are the same as each other.

50. The combination as defined in claim 41, wherein said first and second directions are opposite to each other.

51. The combination as defined in claim 40, wherein said front exhaust pipe of one of said pair of catalytic converters and said rear exhaust pipe of another of said catalytic converters are arranged in a straight line in said lengthwise direction on a same side of said catalytic converters arranged in a straight line in said lengthwise direction.

52. The combination as defined in claim 51, wherein said catalytic converters have a generally oblong cross-section, said catalytic converter of one of said pair of exhaust pipe assemblies being inclined in one direction to overhang said front exhaust pipe of another of said pair of exhaust pipe assemblies and said catalytic converter of the other of said pair of exhaust pipe assemblies being inclined in another direction opposite to said one direction to overhang said rear exhaust pipe of said one of said pair of exhaust pipe assemblies.

53. The combination as defined in claim 51, wherein said catalytic converters have a generally oblong cross-section, said catalytic converter of one of said pair of exhaust pipe assemblies being inclined in one direction to overhang said front exhaust pipe of another of said pair of exhaust pipe assemblies and said catalytic converter of the other of said pair of exhaust pipe assemblies being inclined in the same direction as said one direction to overhang said rear exhaust pipe of said one of said pair of exhaust pipe assemblies.

54. The combination as defined in claim 40, further comprising a flexible portion interposed in said front exhaust pipe of each said exhaust pipe assembly.

55. The combination as defined in claim 54, wherein said flexible portion is made of a bellows.

56. The combination as defined in claim 55, wherein said flexible portion of one of said pair of exhaust pipe assemblies is located under said internal combustion engine.

57. The combination as defined in claim 56, further comprising an oil pan attached to said engine, with a stepped bottom which provides under said internal combustion engine a shallow oil pan section adjacent to a transmission connected to said internal combustion engine and a deep oil pan section remote from said transmission so as to locate said flexible portion of said one of said pair of exhaust pipe assemblies under said oil pan between said deep oil pan section and said transmission.

58. The combination as defined in claim 57, wherein a rear end of said flexible portion of said one of said pair of exhaust pipe assemblies is located within a contour of said stepped bottom.

59. The combination as defined in claim 55, wherein both of said flexible portions of said pair of exhaust pipe assemblies are located between said internal combustion engine and said catalytic converters, respectively.

60. The combination as defined in claim 54, wherein said catalytic converters have a generally oblong cross-section, said catalytic converter of one of said pair of exhaust pipe assemblies being inclined in a first direction to overhang said front exhaust pipe of another of said pair of exhaust pipe assemblies and said catalytic converter of the other of said pair of exhaust pipe assemblies being inclined in a second direction to overhang said rear exhaust pipe of said one of said pair of exhaust pipe assemblies.

61. The combination as defined in claim 60, wherein said first and second directions are the same as each other.

62. The combination as defined in claim 60, wherein said first and second directions are opposite to each other.

63. The combination as defined in claim 54, wherein said pair of exhaust pipe assemblies are tightly connected between said catalytic converters by rigid fastening means and fixed to a front wheel suspension member through an elastic member connected to at least one of said front exhaust pipes.

64. The combination as defined in claim 63, wherein said rigid fastening means is connected to said floor panel structure through an elastic member.

65. The combination as defined in claim 40, wherein said front exhaust pipe of one of said pair of exhaust pipe assemblies and said rear exhaust pipe of another of said pair of exhaust pipe assemblies are shaped to intersect each other and form a generally X-like formation between said pair of catalytic converters so that said catalytic converters are arranged in a same horizontal plane in said lengthwise direction.

66. The combination as defined in claim 65, wherein said front exhaust pipe of one of said pair of exhaust pipe assemblies extends over said catalytic converter of said other of said pair of exhaust pipe assemblies and said rear exhaust pipe of said other of said pair of exhaust pipe assemblies extends over said catalytic converter of said one of said pair of exhaust pipe assemblies.

67. The combination as defined in claim 66, wherein said catalytic converters have a generally elliptical cross section.

68. The combination as defined in claim 67, wherein each said catalytic converter is arranged with a long axis in said horizontal plane.

69. The combination as defined in claim 40, wherein said front exhaust pipes of said pair of exhaust pipe assemblies extend across a steering rack of a front steering system.

70. The combination as defined in claim 69, wherein said front exhaust pipes of said pair of exhaust pipe assemblies extend across and under said steering rack.

71. The combination as defined in claim 69, wherein said front exhaust pipes of said pair of exhaust pipe assemblies extend across and over said steering rack.

72. The combination as defined in claim 69, wherein said front exhaust pipe of one of said pair of catalytic converters and said rear exhaust pipe of another of said catalytic converters are arranged in a straight line in said lengthwise direction on a same side of said catalytic converters arranged in a straight line in said lengthwise direction.

73. The combination as defined in claim 69, wherein said catalytic converters have a generally oblong cross-section, said catalytic converter of one of said pair of exhaust pipe assemblies being inclined in a first direction to overhang said front exhaust pipe of another of said pair of exhaust pipe assemblies and said catalytic converter of the other of said pair of exhaust pipe assemblies being inclined in a second direction to overhang said rear exhaust pipe of said one of said pair of exhaust pipe assemblies.

74. The combination as defined in claim 73, wherein said first and second directions are the same as each other.

75. The combination as defined in claim 73, wherein said first and second directions are opposite to each other.

76. The combination as defined in claim 69, further comprising a flexible portion interposed in said front exhaust pipe of each said exhaust pipe assembly.

* * * * *